United States Patent Office 3,796,700
Patented Mar. 12, 1974

3,796,700
ADENOSINE DERIVATIVES AND THE
PRODUCTION THEREOF
Yoshio Yoshioka, Osaka, Ryuji Marumoto, Minoo, Mikio Honjo, Takatsuki, and Kenzo Kikuchi, Ibaraki, Japan, assignors to Takedo Chemical Industries, Ltd., Osaka, Japan
No Drawing. Filed June 23, 1971, Ser. No. 156,138
Claims priority, application Japan June 30, 1970, 45/57,507
Int. Cl. C07d 51/54
U.S. Cl. 260—211.5 R                    7 Claims

ABSTRACT OF THE DISCLOSURE

Novel therapeutically active adenosine derivatives are provided including a process for the preparation thereof. These compounds are characterized by a prolonged coronary dilatory action and platelet aggregation inhibiting action.

---

This invention relates to novel adenosine derivatives having a prolonged coronary dilatory action and platelet aggregation inhibiting action, and to the production thereof.

Heretofore, though, it has been known that adenosine has a coronary dilatory action, adenosine has never used as a coronary dilatory agent because of its rapid decomposition in blood. Recently, it was reported that an adenosine derivative, $N^6$-[Naphthyl-(1)-methyl]-adenosine, had long-lasting action as compared with adenosine itself [Arzneimittel Forschung vol. 19, 701–704 (1969)]. But the action of the aforementioned adenosine derivative was not too effective or prolonged.

One aspect of this invention is to provide new and novel adenosine derivatives having strong and prolonged coronary dilatory action and platelet aggregation inhibiting action.

Another aspect of this invention is to provide a method for production of such new and novel adenosine derivatives.

The adenosine derivatives of this invention are represented by the following General Formula I;

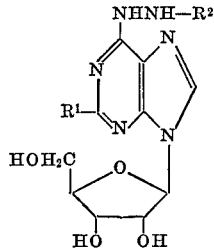

wherein $R^1$ is hydrogen or an amino group, $R^2$ is an aromatic hydrocarbon residue or heterocyclic residue which may have one or more of substituents such as halogen, hydroxyl, amino, oxo, alkyl, alkoxy, and aryl group.

Referring to the Formula I, the aromatic hydrocarbon residue represented by $R^2$ is exemplified by an aryl residue (e.g. phenyl, naphthyl), and the heterocyclic residue represented by $R^2$ may, for example, be one in which one or more nitrogen atoms are included as hetero atoms, and is typically exemplified by pyrrolyl, furyl, pyridyl, imidazolyl, pyrazolyl, pyrimidinyl, pyridazinyl, pyrazinyl, triazolyl, triazinyl, tetrazinyl, thiazolyl, oxazolyl and a residue of a fused ring compound having a heterocyclic ring e.g., indolyl, quinolyl. The aromatic hydrocarbon and heterocyclic residues may have substituents such as hydroxyl, amino, halogen (e.g. chlorine, bromine, fluorine), alkyl (e.g. methyl, ethyl, propyl), alkoxy (e.g. methoxy, ethoxy, propoxy), aryl (e.g. phenyl, 1 and 2-naphthyl) and oxo.

The compounds represented by Formula I are produced by reacting nebularin derivatives represented by the following General Formula II;

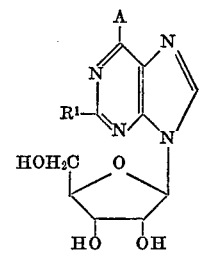

with a compound of the following General Formula III

B—R²                    III wherein $R^1$ and $R^2$ have the same meaning as above, either A or B is halogen such as chlorine, bromine, fluorine, $R^3$—S— or $R^3$—SO$_2$— ($R^3$ is hydrogen, alkyl such as methyl, ethyl, propyl or aralkyl such as benzyl, phenethyl) and the other group is a hydrazino group.

To produce Compounds I wherein $R^2$ is an aromatic hydrocarbon residue which may have such substituents as mentioned above in high yield, it is desirable to employ both the Compound II wherein A is halogen, $R^3$—S— or $R^3$—SO$_2$— (wherein each $R^3$ has the same meaning as above) and the Compound III wherein B is a hydrazino group, as starting materials.

The compounds of Formula III may be employed in the form of their salts and illustratively an inorganic acid salt such as the corresponding hydrochloride or sulfate.

The reaction of Compounds II and III is carried out in the presence or in the absence of a solvent. When a solvent is used, solvents such as water, ethanol, 2-methoxyethanol or mixtures thereof are suitable. The reaction advantageously proceeds at elevated temperatures such as, for example, 60° C.–150° C.

The reaction of Compounds II and III is advantageously carried out in the presence of an acid acceptor such as sodium acetate, triethylamine. In this connection, it is possible to employ an excess of the starting hydrazine derivative as an acid acceptor.

The reaction mixture is, for example, filtered, concentrated and recrystallized from a suitable solvent to isolate the desired end product.

The end product is usually obtained in the form of the free base and, if required or desired, may be converted into their pharmaceutically acceptable salts such as the hydrochloride, nitrate, sulfate, phosphate, picrate, toluenesulfonate, methiodide, etc., by conventional procedures.

The new and novel adenosine derivatives of this invention have a long-lasting and strong coronary dilatory activity.

The activity of illustrative compounds of this invention is demonstrated in the following tests.

TEST FOR THE CORONARY DILATING ACTIVITY

Beagle dogs of either sex, weighing from 8 to 11 kg., were anesthetized with pentobarbital sodium 30 mg./kg. intravenously (i.v.). Under artificial respiration with room air, the chests of these aniamls were opened through the fifth left intercostal space. After heparinization, the anterior descending branch of the left coronary artery was proximally ligated and the distal segment immediately was cannulated with a bent polyethylene cannula and perfused with the blood flowing through an electromagnetic flowmeter (produced by Nihon Kohden) from the left carotid artery. Compounds tested were dissolved in 0.9% saline or polyethylene glycol 400 and injected directly into the coronary artery through a cannula. The coronary dilating activity of substances after the intracoronary injection (i.c.) was expressed as the ratio:

$$\frac{\text{peak response to substance tested} - \text{peak response to solvent}}{\text{peak response of adenosine (5 } \mu\text{g.)}} = \text{Potency Index}$$

The results are shown as follows:

TABLE 1
[Coronary dilating activity (i.c.)]

| Compound | 10 μg./dog Potency index | 10 μg./dog Duration, T1/2 [1] (sec.) | 30 μg./dog Potency index | 30 μg./dog Duration T1/2 [1] (sec.) |
| --- | --- | --- | --- | --- |
| N$^\alpha$-[naphthyl-(1)]-methyladenosine (control) | 0.59 | 30 | 0.94 | 60 |
| N-(4-methyl-6-methoxy-pyrimidin-2-yl)-N'-(9-β-D-ribofuranosylpurin-6-yl)-hydrazine | 1.03 | 30 | 1.78 | 86 |
| N-(4-methylquinolin-2-yl)-N'-(9-β-D-ribofuranosylpurin-6-yl) hydrazine | 0.82 | 115 | 1.24 | 280 |
| N-(benzothiazol-2-yl)-N'-(9-β-D-ribofuranosylpurin-6-yl)hydrazine | | | 1.03 | 270 |
| 5 μg. adenosine (control) | 1.0 | 15 | 1.0 | 15 |

[1] Time to 50% recovery.

Pharmaceutical compositions containing one or more of the compounds of this invention can be prepared according to per se conventional methods for the preparation of powder, capsules, pills, injections, etc.

A typical effective daily dose of the compounds of this invention, when administered orally to a human adult, for the purpose of, for example, treating coronary insufficiency, is usually about 0.1 mg. to 50 mg. although an increased or reduced daily dose is also effective depending on the symptoms.

In the following examples, the relationship between parts by weight and parts by volume corresponds to the relationship between grams and milliliters.

EXAMPLE 1

One part by weight of chloronebularin is allowed to react with 1.5 part by volume of phenylhydrazine in 30 parts by volume of 2-methoxyethanol under heating at 120° C. for 3 hours. The reaction mixture is subjected to filtration and the filtrate is concentrated until a viscous liquid is obtained. To the liquid is added chloroform, whereby precipitates separate out. The recrystallization of the precipitates from aqueous ethanol gives 0.5 part by weight of N-phenyl-N'-(9β-D-ribofuranosylpurin-6-yl)hydrazine as colorless crystals. M.P. 198°–200° C.

Ultraviolet absorption spectrum:

$\lambda_{max.}^{EtOH}$ 235.5 mμ ($\epsilon$=12,000), 265 mμ ($\epsilon$=16,100)

Employment of 1-naphthylhydrazine in place of phenylhydrazine gives N-(1-naphthyl)-N'-(9-β-D-ribofuranosylpurin-6-yl)hydrazine by a similar manner to the above.

Ultraviolet absorption spectrum:

$\lambda_{max.}^{1/1\ ON-HCl}$ 212.5 mμ ($\epsilon$=52,000), 260 mμ ($\epsilon$=18,800)

EXAMPLE 2

2.2 parts by weight of 6-chloronebularin are allowed to react with 3.6 parts by weight of 2-naphthylhydrazine hydrochloride in a mixture of 25 parts by volume of 1 N aqueous solution of sodium hydroxide and 50 parts by volume of 2-methoxyethanol under heating at 80° C. for 4 hours. The reaction mixture is subjected to filtration and the filtrate is concentrated until a viscous liquid is obtained. To the liquid is added ether and resulting precipitates are collected, washed with ether, then with water, whereby 1.2 part by weight of N-(2-naphthyl)-N'-(9-β-D-ribofuranosylpurin-6-yl)hydrazine is obtained.

Ultraviolet absorption spectrum:

$\lambda_{max.}^{1/1\ ON-HCl/MeOH}$ 238 mμ ($\epsilon$=37,400), 263 mμ ($\epsilon$=22,200)

EXAMPLE 3

One part by weight of 6-chloronebularin is allowed to react with 0.94 part by weight of 4-bromo-1-naphthyl-hydrazine in 50 parts by volume of 50% aqueous methanol containing 1.0 part by weight of sodium acetate under reflux for 5 hours. The reaction mixture is treated by a manner similar to that in Example 2. The resulting precipitates are recrystallized from methanol to obtain 0.45 parts by weight of N-(4-bromo-1-naphthyl)-N'-(9-β-D-ribofuranosylpurin-6-yl)hydrazine as crystals. M.P. 150°–153° C.

Ultraviolet absorption spectrum:

$\lambda_{max.}^{EtOH}$ 250 mμ ($\epsilon$=23,600), 328 mμ ($\epsilon$=10,200)

EXAMPLE 4

N - (1 - naphthyl) - N' - (2 - amino - 9 - β - D - ribofuranosylpurin-6-yl)hydrazine is obtained as crystals by allowing 2-amino-6-chloronebularin to react with 1-naphthylhydrazine in a similar manner to that in Example 3.

Ultraviolet absorption spectrum:

$\lambda_{max.}^{EtOH}$ 242 mμ ($\epsilon$=20,900), 290 mμ ($\epsilon$=12,600)

EXAMPLE 5

2.8 parts by weight of 6-chloronebularin are allowed to react with 1.6 part by weight of 4-hydrazinoquinazoline in 50 parts by volume of 50% aqueous methanol containing 1.0 part by weight of sodium acetate under reflux for 3 hours. The reaction mixture is allowed to stand for a while, whereby precipitates separate out. Recrystallization of the precipitates from 50% aqueous ethanol gives 1.8 part by weight of N-(quinazolin - 4 - yl)-N'-(9-β-D-ribofuranosylpurin - 6 - yl)hydrazine as yellow crystals. M.P. 183°–192° C.

Ultraviolet absorption spectrum:

$\lambda_{maxj}^{MeOH}$ 294 mμ ($\epsilon$=12,500), 375 mμ ($\epsilon$=27,900)

According to a manner similar to the above, the following compounds are obtained.

| Compound | Melting point, ultraviolet absorption spectrum, specific rotatory power |
| --- | --- |
| (a) N-(phthalazin-1-yl)-N-(9-β-D-ribofuranosylpurin-6-yl)-hydrazine. | $\lambda_{max.}^{ETOH}$ 231.5 mμ ($\epsilon$=30,300) 276 mμ (shoulder) 293 mμ ($\epsilon$=22,290) 326 mμ ($\epsilon$=8,500) |
| (b) N-(4-methylquinolin-2-yl)-N'-(9-β-D-ribofuranosyl-purin-6-yl)hydrazine. | $\lambda_{max.}^{MeOH}$ 236.5 mμ ($\epsilon$=30,100) 266 mμ ($\epsilon$=21,700) 325 mμ ($\epsilon$=8,200) |
| (c) N-(4-phenylpyridin-2-yl)-N'-(9-β-D-ribofuranosyl-purin-6-yl)hydrazine. | $\lambda_{max.}^{ETOH}$ 238 mμ ($\epsilon$=33,400) 259 mμ ($\epsilon$=36,100) 300 mμ (shoulder) |
| (d) N-(4-amino-S-triazin-2-yl)-N'-(9-β-D-ribofuranosyl-purin-6-yl)hydrazine. | M.P., 177°–178° C. $\lambda_{max.}^{MeOH}$ 266 mμ ($\epsilon$=18,400) |
| (e) N-(3-phenylquinoxalin-2-yl)-N'-(9-β-D-ribofurano-sylpurin-6-yl)hydrazine. | M.P., 215°–216° C. $\lambda_{max.}^{EtOH}$ 306 mμ ($\epsilon$=26,500) |
| (f) N-(4-hydroxyl-6-phenyl-pyrimidin-2-yl)-N'-(9-β-D-ribofuranosylpurin-6-yl)hydrazine. | M.P., 216° C. |
| (g) N-(pyrimidin-2-yl)-N'-(9-β-D-ribofuranosylpurin-6-yl)-hydrazine. | $[\alpha]_D^{28}$=58.0°– (c=0.54, DMSO) |
| (h) N-(caffein-8-yl)-N'-(9-β-D-ribofuranosylpurin-6-yl)-hydrazine. | $\lambda_{max.}^{EtOH}$ 289 mμ ($\epsilon$=24,200) 260 mμ (shoulder), M.P., 181° C. $[\alpha]_D^{27}$=−48.5° (c=0.4 BMSO) |

TABLE—Continued

| Compound | Melting point, ultraviolet absorption spectrum specific rotatory power |
|---|---|
| (i) N-(4,6-dimethylpyrimidin-2-yl)-N'-(9-β-D-ribofuranosylpurin-6-yl)hydrazine. | $\lambda^{EtOH}_{max.}$ 266.5 mμ (ε=18,400) $[\alpha]_D^{31}=-59.4°$ (c=0.51, EtOH) |
| (j) N-(2-phenylpyrimidin-4-yl)-N'-(9-β-D-ribofuranosylpurin-6-yl)hydrazine. | M.P. 173° C. $\lambda^{MeOH}_{max.}$ 259 mμ (ε=28,500) $[\alpha]_D^{25}=-51.0°$ (c=0.5, MeOH) |
| (k) N-(isoquinolin-2-yl)-N'-(9-β-D-ribofuranosylpurin-6-yl)-hydrazine. | $\lambda^{0.1N-HCl}_{max.}$ 227 mμ (ε=38,000) 280 mμ (ε=20,000) $\lambda^{0.1N-NaOH}_{max.}$ 228.5 mμ (ε=33,700) 282 mμ (ε=23,100) 320 mμ (ε=8,400) |
| (l) N-[4-oxo-(pyrido-[1,2-a]-pyrimidin-2-yl]-N'-(9-β-D-ribofuranosylpurin-6-yl)-hydrazine. | $\lambda^{MeOH}_{max.}$ 230 mμ (ε=17,700) 268 mμ (ε=34,700) 330 mμ (ε=5,900) |
| (m) N-(benzothiazol-2-yl)-N'-(9-β-D-ribofuranosylpurin-6-yl)hydrazine. | $\lambda^{EtOH}_{max.}$ 268 mμ (ε=21,200) |

EXAMPLE 6

0.8 part by weight of 6-chloronebularin is allowed to react with 0.9 part by weight of 6-hydrazinopurine in 30 parts by volume of 50% aqueous ethanol under reflux for 3 hours. The reaction mixture is allowed to stand for a while, whereby precipitates separate out. The precipitates are collected by filtration and washed with ethanol. Thus, 0.3 part by weight of N - purin - 6 - yl)-N'-(9-β-D-ribofuranosyl-purin - 6 - yl)hydrazine is obtained as a pale yellowish brown powder.

Ultraviolet absorption spectrum:

$\lambda^{EtOH}_{max.}$ 274 mμ (ε=50,100), 335 mμ (ε=6,700)

EXAMPLE 7

0.9 part by weight of 6 - chloronebularin is allowed to react with 1.7 part by weight of 2 - hydrazino-4-methyl-6-methoxypyrimidine in 20 parts by volume of 2-methoxyethanol under treating at 120° C. for 4 hours. The reaction mixture is adjusted to pH 6 by the addition of 1 N-hydrochloric acid, followed by the addition of 20 parts by volume of ethanol, the mixture is concentrated and allowed to stand for a while, whereby N - (4 - methyl - 6-methoxypyrimidin-2-yl) - N' - (9 - β - D-ribofuranosylpurin-6-yl) hydrazine hydrochloride is obtained as crystals. Yield: 0.6 part by weight, M.P. 140° C.

Ultraviolet absorption spectrum:

$\lambda^{H_2O}_{max.}$ 264 mμ (ε=22,300)

EXAMPLE 8

0.28 part by weight of 6-hydrazinonebularin is allowed to react with 0.16 part by weight of 4-chloroquinazoline in 10 parts by volume of 50% aqueous ethanol containing 0.17 part by weight of sodium acetate under reflux for 3 hours, and allowed to stand for a while, whereby precipitates separate out. Recrystallization of the precipitates from 50% aqueous ethanol gives 0.22 part by weight of N - (quinazolin - 4 - yl) - N' - (9-β-D-ribofuranosylpurin - 6 - yl) hydrazine as crystals. The product is identical with the product obtained in Example 5.

EXAMPLE 9

One part by weight of 6-methylthionebularin is allowed to react with 1.4 part by weight of 2-hydrazino-3-methylquinazoline in 30 parts by volume of 50% aqueous ethanol under reflux for 3 hours, concentrated under reduced pressure and allowed to stand for a while, whereby precipitates separate out. Recrystallization of the precipitates from a mixture of dimethylsulfoxide and ethyl acetate gives 0.36 part by weight of N-(3-methylquinoxalin-2-yl) - N' - (9-β-D-ribofuranosylpurin-6-yl) hydrazine as yellowish brown crystals. M.P. 230° C.

What is claimed is:

1. An adenosine compound of the formula

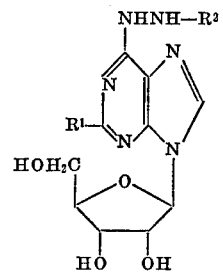

wherein $R^1$ is hydrogen or an amino group, $R^2$ is an aromatic hydrocarbon residue selected from the group consisting of a phenyl and a naphthyl group, or a heterocyclic residue selected from the group consisting of pyrrolyl, furyl, pyridyl, imidazolyl, pyrazolyl, pyrimidinyl, pridazinyl, pyrazinyl, triazolyl, triazinyl, tetrazinyl, thiazolyl, oxazolyl, indolyl, quinolyl, quinazolinyl, phthalazinyl, pyrinyl, quinoxalinyl, pyrido - (1,2-a) - pyrimidinyl, isoquinolyl and benzothiazolyl and a pharmaceutically acceptable salt thereof.

2. An adenosine compound according to claim 1 wherein $R^1$ is hydrogen and $R^2$ is a heterocyclic residue selected from the group consisting of pyrrolyl, furyl, pyridyl, imidazolyl, pyrazolyl, pyrimidinyl, pyridazinyl, pyrazinyl, triazolyl, triazinyl, tetrazinyl, thiazolyl, oxazolyl, indolyl, quinolyl, quinazolinyl, phthalazinyl, pyrinyl, quinoxalinyl, pyrido-(1,2-a) - pyrimidinyl, isoquinolyl and benzothiazolyl and a pharmaceutically acceptable salt thereof.

3. An adenosine compound according to claim 1, which is N-(4 - methyl - 6 - methoxypyridin-2-yl)-N'-(9-β-D-ribofuranosylpurin-6-yl)hydrazine or a pharmaceutically acceptable salt thereof.

4. An adenosine compound according to claim 1, which is N-(4-methylquinolin - 2 - yl)-N'-(9-β-D-ribofuranosylpurin-6-yl) hydrazine or a pharmaceutically acceptable salt thereof.

5. An adenosine compound according to claim 1 which is N-(benzothiazol - 2 - yl)-N'-(9-β-D-ribofuranosylpurin-6-yl) hydrazine or a pharmaceutically acceptable salt thereof.

6. An adenosine compound according to claim 1 in which $R^2$ has a substituent selected from the group consisting of hydrogen, halogen, hydroxyl, amino, oxo, alkyl, alkoxy, phenyl and naphthyl, said alkyl and alkoxy groups having 1 to 3 carbon atoms.

7. An adenosine compound according to claim 2 in which $R^2$ has a substituent selected from the group consisting of hydrogen, halogen, hydroxyl, amino, oxo, alkyl, alkoxy, phenyl and naphthyl, said alkyl and alkoxy groups having 1 to 3 carbon atoms.

References Cited

UNITED STATES PATENTS

| 3,133,912 | 5/1964 | Kimmig et al. | 260—211.5 R |
| 3,575,959 | 4/1971 | Shen et al. | 260—211.5 R |
| 3,590,029 | 6/1971 | Koch et al. | 260—211.5 R |

FOREIGN PATENTS

| 10,979 | 6/1965 | Japan | 260—211.5 |

JOHNNIE R. BROWN, Primary Examiner

U.S. Cl. X.R.

424—180

UNITED STATES PATENT OFFICE
CERTIFICATE OF CORRECTION

Patent No. 3,796,700　　　　　　　　　Dated March 12, 1974

Inventor(s) Yoshio Yoshioka, et al

It is certified that error appears in the above-identified patent and that said Letters Patent are hereby corrected as shown below:

In column 4, line 69: the temperature should read -- -58.0°--

In column 5, line 34: before "purin" insert --(--

In claim 1, lines 26-27 of column 6, "pridazinyl" should be

--pyridazinyl--.

Please amend the name of the Assignee Company to read "Takeda"

Signed and sealed this 29th day of October 1974.

(SEAL)
Attest:

McCOY M. GIBSON JR.　　　　　　　　C. MARSHALL DANN
Attesting Officer　　　　　　　　　　Commissioner of Patents